INVENTORS.
WARREN B. LUDWIG.
JOHN F. EWALD JR.
BYRON E. ELERATH
BY:
Le Fever, Quillman & Hubbard

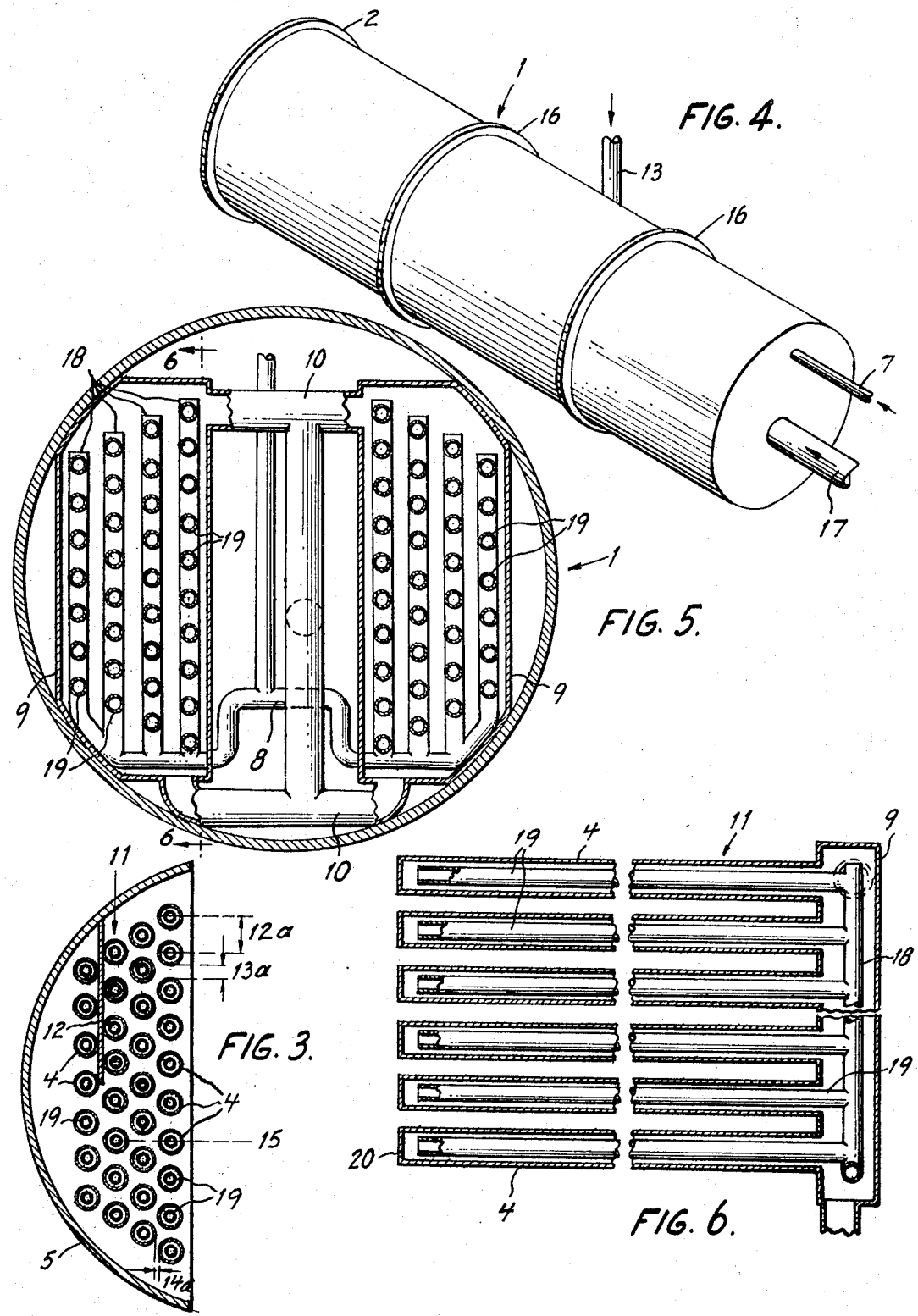

United States Patent Office 3,443,324
Patented May 13, 1969

3,443,324
TUBULAR FREEZE-DRYING CONDENSER
Warren B. Ludwig, Edmonds, Wash., and Byron E.
Elerath, Mountain Lakes, and John F. Ewald, Jr.,
New Milford, N.J., assignors to General Foods
Corporation, White Plains, N.Y., a corporation of
Delaware
Filed Sept. 15, 1967, Ser. No. 668,229
Int. Cl. F26b 13/30
U.S. Cl. 34—92                                    6 Claims

ABSTRACT OF THE DISCLOSURE

An improved freeze-drying condenser consisting of a set of tubes which are mounted internally in a freeze-drying chamber. The condenser is compact and is capable of handling the large peak loads experienced in a batch freeze-drying cycle. Operating efficiency of the freeze-drying system is increased by protecting vacuum pumps from exposure to excessive moisture vapor and by minimizing condenser plugging.

BACKGROUND OF THE INVENTION

This invention relates to a condenser mounted internally in a vacuum freeze-drying chamber. The condenser is tubular in design and incorporates features which provide protection against fouling of vacuum pump oil and provide for reliable operation.

The use of freeze-drying in industry as a method of retaining quality in a dehydrated product is rapidly expanding due to the development of new techniques and equipment which have made freeze-drying more economically competitive with other methods of dehydration. However, freeze-drying is still a relatively expensive form of dehydration compared to methods such as spray-drying or drum-drying.

Attempts to develop a more economical process have made available to the manufacturer a variety of vacuum freeze-drying systems. These systems may be broadly classified as continuous, semi-continuous and batch. A continuous freeze-drying system is one in which product is continuously fed into and discharged from the drying chamber. In a batch freeze-drying system, product is placed in the drying chamber as a unit or batch and when the drying cycle is completed, the product is removed as a unit or batch. In a semi-continuous system, the drying chamber accommodates more than one batch, and the several batches in the drying chamber are at different stages of dehydration, but the product is fed into and discharged from the chamber in batches.

An essential component of vacuum freeze-drying systems is a means of condensing the sublimed water vapors. Condensers may be broadly classified as internal or external, an external condenser being one which is located outside the vacuum chamber containing the product being dehydrated and an internal condenser being one which is located within the vacuum chamber containing the product being dehydrated. Continuous and batch vacuum freeze-drying systems using internal or external condensers are available. In a batch freeze-dryer system there are certain advantages and disadvantages associated with an internal condenser. A vacuum chamber with an internal condenser generally requires less floor space than a chamber with an external condenser. Also, the installation of large vacuum lines from the chamber to the condenser is eliminated. In complex systems using a multiplicity of vacuum chambers and external condensers, the large lines from the chambers to the condensers usually contain valves to permit isolating condensers from chambers and to fully utilize the available condensers. These expensive valves are eliminated by use of internal condensers. Internal condensers have the disadvantage of needing to be defrosted between freeze-drying runs, thus taking up time which could be used for drying another batch if external condensers are used. Another disadvantage of internal condensers is a lack of flexibility if all or part of the internal condenser is inoperative due to blockages within the condenser which restrict the flow of refrigerant. In a system using external condensers, the flow of vapors could be directed to a second condenser if one condenser plugs. Therefore, it is essential that the operation of an internal condenser be efficient to prevent major losses of productivity.

Another essential component of all vacuum freeze-drying systems is a means of evacuating the drying chamber and, if external condensers are used, the condenser shell or housing. Several means of pulling a vacuum can be used, such as steam or water jet ejectors or mechanical pumps. The most widely used vacuum source is an oil sealed mechanical vacuum pump or an oil sealed pump in series with one or more blowers. In freeze-drying, while the product is being dried, the function of the condenser is to trap the water vapor and other condensable vapors, and the function of the vacuum pump is to remove non-condensable gases which may evolve from the product or may be introduced into the system by inleakage through valve flanges, door gaskets, etc. as these items do not normally form seals which are 100% effective. The oil in the vacuum pumps is easily fouled by water vapor to the point where the pump loses efficiency and cannot maintain a chamber pressure necessary to prevent product from melting and being degraded, or a chamber pressure necessary to permit drying the product at a desired rate. Therefore, it is essential that the condenser design is such that condensable vapors are efficiently trapped and are not permitted to flow on to the vacuum pump.

In the production of large volume, relatively low cost products, for example, freeze-dried coffee as compared to blood plasma of a specific blood type, it is necessary to obtain maximum productivity with a minimum investment in equipment and installation and with a minimum of operating personnel. Therefore, when using a batch system with internal condensers it is desirable to dry as large a batch of product as possible in the shortest possible time consistent with product quality. Design of the internal condensers is, therefore, critical in order to achieve a balance between the volume of the chamber occupied by the condenser and the condensation rate needed to support the drying process. When a batch of product is freeze-dried in a vacuum chamber, the sublimation of water vapor proceeds very rapidly during the initial drying period and gradually falls off as the ice layer recedes from the surface of the product. Therefore, the condenser must have the capacity to support the drying process during the initial drying period, but it would be permissible for the capacity of the condenser to decrease as the drying cycle progressed, as long as the condenser was able to handle the amount of subliming vapors emitting from the product at all points in the drying cycle.

The fan-shaped, plate condenser described in U.S. Patent 3,132,930 while representing an advance in the design of internal condensers, has been found wanting in several critical areas. The ice build-up on the plates is uneven, with more ice condensing on the inner portion of the plates than on the outer portions, thus showing that the entire condensing surface is not being utilized efficiently. The rate of condensation on the plates has been limited to about 340 pounds of sublimate per hour and, therefore, the drying time for large product batches which under desired operating conditions emit vapors at a rate in excess of 700 pounds of sublimate vapor per hour has to be extended and heat input limited so that the rate of sublimation of water vapor does not exceed condenser capacity. Plugging of orifices in refrigerant lines servicing the condenser plates has reduced the efficiency of the condensers and has caused lengthy shutdowns on chambers in order to physically dismantle the refrigerant lines for the purpose of clearing plugged orifices. The size of the holes in the orifice plates are necessarily small, on the order of $\frac{1}{32}$ of an inch in order to create enough pressure drop to ensure uniform feed of liquid to all of the condenser plates. Water vapors have bypassed the condenser plates and passed on to the vacuum pumps in sufficient amounts to foul the vacuum pump oil and reduce the pump efficiency to the point where more than one vacuum pump was needed to sustain a drying run and to the point where drying runs had to be lengthened because the fouled vacuum pumps were operating at less than 25% of their rated capacity. The condenser of this invention has been designed to overcome the deficiencies and limitations noted.

SUMMARY OF THE INVENTION

This invention relates to a tubular, internal condenser for a vacuum freeze-drying chamber. The condenser consists of two sets of tubes mounted on the sides of the chamber, said chamber being preferably cylindrical in shape. All of the tubes mounted on one side of a chamber are herein referred to as a set. The tubes in a set are arranged in laterally spaced vertical rows. The tubes within each row are uniformly spaced in a vertical direction. Tubes in adjacent rows are staggered to provide a tortuous path of travel for vapors within the chamber. The sets of tubes are mounted in tube supports which are shaped to make close contact with the wall of the chamber. The sets of tubes are spaced to provide room for a product load between the sets.

One of the objects of this invention is to provide a condenser which will aid in maximizing the productivity of a batch vacuum freeze-drying chamber. To achieve this goal, the number of tubes to be used in a set and the size of the tubes are determined by consideration of the quantity of vapors to be condensed, the rate at which they must be condensed and the quantity of refrigerant which must pass through the tubes to remove the heat of condensation and to maintain the desired condenser temperature. The spacing of the tubes should be sufficient to allow for a uniform ice build-up around the tubes. The uniform deposition of ice around the tubes enables the condenser to sustain a preferred freeze-drying cycle which usually requires high condensation rates at the beginning of the drying cycle and lower condensation rates toward the end of the drying cycle when the ice layer has receded from the surface of the product.

A further object of this invention is to provide adequate protection for the vacuum pumps used in a freeze-drying system by minimizing the amount of water vapor which bypasses the condenser and flows with the non-condensable gases to the vacuum pump. The amount of condensable vapors escaping the chamber is minimized by creating a tortuous path of travel for the vapors past the condenser tubes and by mounting the tubes in support plates that are in intimate contact with the chamber wall, thus preventing condensable vapors from bypassing the condenser. A condensable vapor is defined as a vapor which will change from the gaseous to the solid state if chilled to the surface temperature of the condenser at the pressure in the condenser area of the chamber. A non-condensable vapor is a gas which will not change state at the aforementioned temperature and pressure. The opening in the chamber for non-condensable gases must be located in the wall of the chamber covered by a set of condenser tubes in order for the condenser to effectively prevent condensable vapors from leaving the chamber. The separation of condensable and non-condensable vapors is further improved by placing a baffle plate between two rows of tubes such that a secondary or clean-up zone is created. The primary condensing zone encompasses the bulk of the condensing tubes in the set. The secondary zone includes those tubes between the wall of the chamber and the baffle plate. The outlet for non-condensable vapors must now be located in the wall of the chamber forming part of the secondary condensing zone.

Still another object of this invention is to insure maximum utilization of the condensing tubes by minimizing occurrence of blockages in flow of refrigerant to a tube or tubes. Construction of this invention minimizes blockage of flow of refrigerant to the tubes by feeding the liquid refrigerant from a riser to the inlet of the condenser tubes through feed tubes, one feed tube per condenser tube inlet. The aforementioned riser is the refrigerant pipeline through which refrigerant is brought into the vacuum chamber. The feed tubes create a back pressure to the flow of refrigerant sufficient to insure uniform distribution of refrigerant to all of the condenser tubes. The advantage of the feed tubes is that the internal diameter can be large enough to prevent blockage by grit or ice which may be carried by the refrigerant while still creating sufficient back pressure on the system by using a length of feed tube sufficient to insure a desired pressure drop across the feed tube. The pressure drop across the feed tube is a function of the internal diameter of the feed tube, the length of the feed tube and the volume of refrigerant passing through the feed tube.

DESCRIPTION OF THE DRAWINGS

FIGURE 3 is an end view of a tube support showing the arrangement of condenser tubes within a set.

FIGURE 4 is an external view of the cylindrical chamber showing refrigeration lines and vacuum line entering the chamber.

FIGURE 5 is a vertical fragmented view of the chamber and refrigeration lines showing the inlet risers within the outlet risers.

FIGURE 6 is a longitudinal fragmented view of one row of condenser tubes showing the arrangement of feed tubes within the condenser tubes.

The more detailed description of the drawings following will further clarify the invention.

Figure 1:
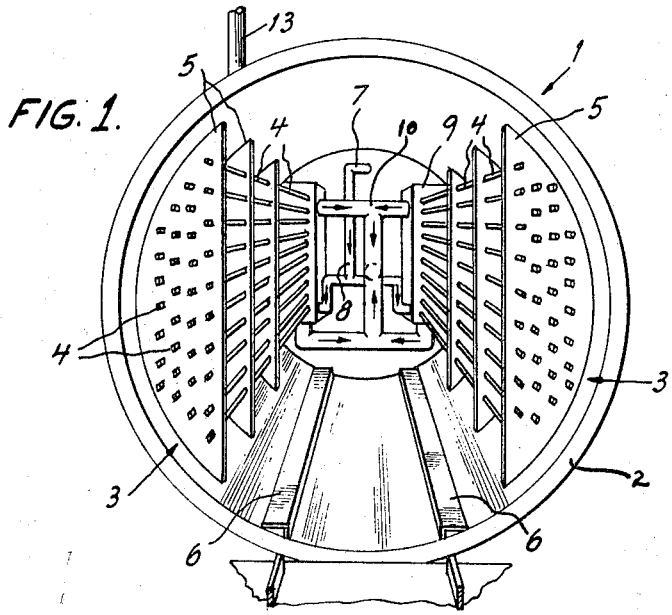
FIGURE 1 is a front end perspective view of a cylindrical vacuum chamber containing the condenser of this invention.

FIGURE 1 shows an end perspective of a cylindrical vacuum chamber 1 from the front with the door (not shown) open. The front edge of the chamber 2 is a flat, circular flange surface against which the door can be seated to seal the vacuum chamber. Within the chamber are two sets 3 of condenser tubes 4 mounted in tube supports 5 on either side of the chamber. The sets are spaced so that a cart containing product can be moved into the chamber on the tracks 6 located at the bottom of the chamber. The refrigerant inlet line 7 is connected to an internal refrigerant inlet header 8 through which refrigerant flows to the inlet risers. Refrigerant from the condenser tubes passes through the outlet risers 9 which are connected by a refrigerant outlet header 10.

Figure 2:
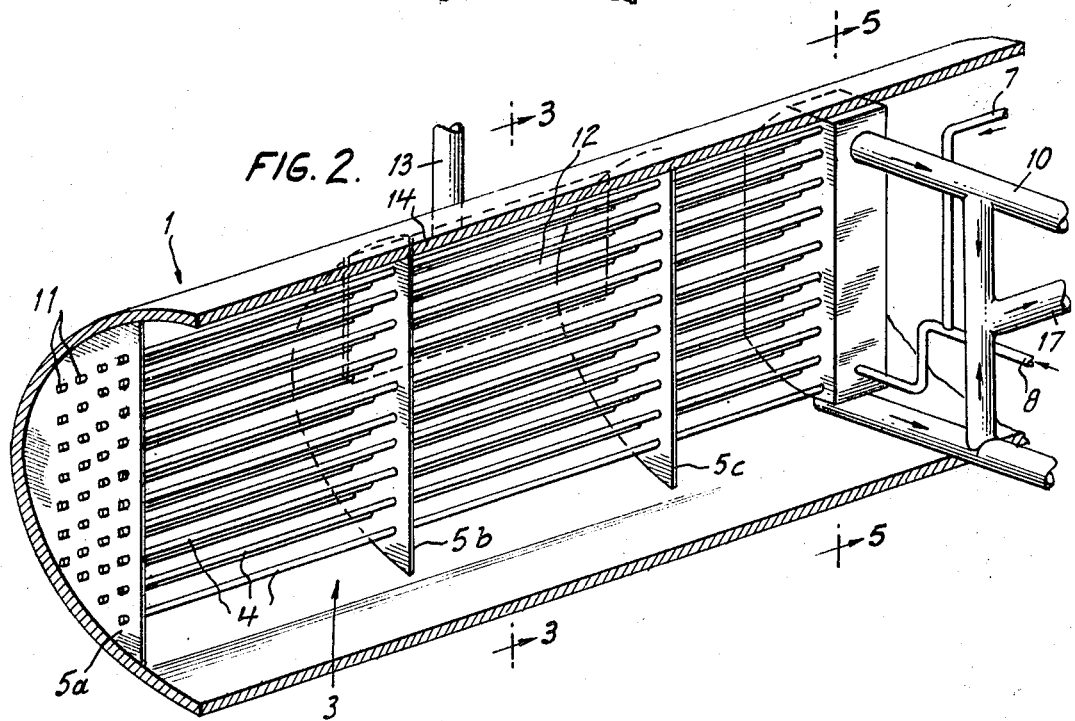
FIGURE 2 is a longitudinal segmented view of the chamber showing one set of condenser tubes and how the tubes connect with the refrigeration piping within the rear of the chamber.

FIGURE 2 is a longitudinal segment of the chamber 1 and one set 3 of condenser tubes 4 showing three tube supports 5a, b, c. Tube support 5a shows how the supports are mounted flush against the chamber wall. A baffle plate 12 is shown mounted vertically between the outer two vertical rows 11 of condenser tubes. The baffle plate 12 extends vertically down from the wall of the chamber past half of the tubes in a vertical row and the plate extends longitudinally to make contact with tube supports 5b and 5c. The tubes between tube supports 5b and 5c behind the baffle plate are in the secondary condensing zone and a duct 13 for removal of non-condensables enters the chamber with an opening through the chamber wall above the secondary condensing zone. At the rear of the chamber 1, the condenser tubes 4 are shown passing into a refrigeration outlet riser 9. The outlet riser is connected to the refrigerant outlet line 17 by an outlet header 10. The refrigerant inlet line 7 is shown connecting to the inlet header 8 which passes into the outlet riser 9.

FIGURE 3 is an end view of a tube support 5 showing the arrangement of condenser tubes 4 in vertical rows 11, the center to center distance 12a between tubes within a row and the vertical distance 13a between the outer wall of two adjacent tubes being uniform throughout the row. The rows of tubes are laterally spaced and adjacent rows are staggered such that a horizontal line through the center of a tube in one row 15 will pass through the vertical space 13a between two tubes in an adjacent row.

FIGURE 4 is an external view of the cylindrical chamber 1 from the side and rear of said chamber showing two structural reinforcement rings 16 and another view of the flange surface 2 at the front of the chamber. The duct for removal of non-condensables 13 is shown entering the chamber wall 14. The refrigerant inlet line 7 and refrigerant outlet line 17 are shown passing through the rear of the chamber.

FIGURE 5 is a vertical fragmented view of the chamber 1 and refrigeration lines showing the refrigerant inlet header 8 passing through the outlet risers 9 to the inlet risers 18, one inlet riser per vertical row of tubes. The outlet risers 9 are connected by the outlet header 10.

FIGURE 6 is a longitudinal fragmented view of one vertical row 11 of six condenser tubes 4 closed at the front end 20 of the chamber 1 and opening into the outlet riser 9 at the other end. One inlet riser 18 is shown within the outlet riser with feed tubes 19 running concentrically within the condenser tubes from the inlet riser to the front end of the condenser tubes.

DESCRIPTION OF THE PREFERRED EMBODIMENTS

An internal condenser for a batch, vacuum freeze-drying chamber comprising two sets of tubes mounted at the sides of the chamber with the condensing tubes extending longitudinally inside the chamber as shown in FIGURE 1.

The condensing tubes are held by tube supports which are mounted at the sides of the chamber in intimate contact with the chamber wall. The tube support 5 in FIGURE 2 is in the shape of a segment of a circle in order to be fitted along the wall of a cylindrical chamber. The condensing tubes pass through perforations in the tube supports.

The arrangement of the perforations corresponds to the desired arrangement of the condensing tubes as shown in FIGURE 3. Condensing tubes in a set are arranged in vertical rows 11, the tubes within a vertical row are uniformly spaced as indicated by 12a and 13 of FIGURE 3. The vertical rows are laterally spaced. The lateral spacing between rows can be uniform throughout the set or the lateral spacing between rows can diminish toward the wall of the chamber. In all cases, the spaces must be of sufficient magnitude to accommodate a desired buildup of ice around the condenser tubes. An ice buildup of about ½ inch is a preferred thickness for design of the spacing. Adjacent rows of tubes are staggered such that a horizontal line drawn through the center of a tube in one row will pass through the vertical space between two tubes in an adjacent row as shown by 15 in FIGURE 3. The outlet duct for non-condensable vapors is situated so that the opening in the wall of the chamber is behind the set of condenser tubes as shown in FIGURE 2 by 14.

A rectangular baffle plate 12 in FIG. 2 mounted vertically between two rows of condenser tubes. The upper edge of the baffle plate is in intimate contact with the chamber wall and extends down past at least one-third of of the condensing tubes in adjacent rows and not past more than two-thirds of the condensing tubes in the adjacent rows. The baffle plate extends longitudinally parallel to the condensing tubes, preferably to a distance where intimate contact is made between the vertical edges of the baffle plate and the sides of the nearest tube supports as shown in FIGURE 2 by 12, 5b and 5c. The majority of the tubes in the set form a primary condensing zone and the tubes between the baffle plate and wall form a secondary condensing zone which increases the efficiency of separation of condensable and non-condensable vapors. The duct for non-condensable vapors is now located such that the opening in the wall of the chamber is above the secondary condensing zone as close to the baffle as is practical.

Refrigerant is supplied to the condenser tubes through risers shown on FIGURE 5 as 18. The risers are connected to the inlet end of the condenser tubes by feed tubes shown as 19 on FIGURE 6 and refrigerant flows from the condenser tubes into an outlet riser 9 on FIGURE 6. The inlets and outlets of the condenser tubes may be arranged so that the refrigerant flows through only one tube between the inlet and outlet risers or through several tubes in series. In FIGURE 6 the refrigerant is shown as flowing through a single tube between the inlet and outlet risers, with the feed tubes running from the discharge end of the condenser tube through the condenser tube in a concentric arrangement to the inlet end of the condenser tube at the front of the chamber. The front end of the condenser tubes in FIGURE 6 are sealed.

The feed tubes have an internal diameter significantly larger than the holes in an orifice plate needed to obtain a desired back pressure and the internal diameter of the feed tubes is preferably at least ⅛ inch.

Examples of the desirable results achieved with this invention will now be given with the understanding that the values given are by way of example and are not to be construed as being limiting.

Example 1

In a cylindrical chamber two sets of condenser tubes were mounted as shown in FIGURE 2. The condensing tubes were 1 inch schedule 40 pipe arranged in a set as shown in FIGURE 3 where 12a is 3 inches. There were seven rows of tubes and the lateral spacing between the inner rows including the center row is 2¹⁹⁄₃₂ inches and the lateral spacing between the outer rows including the center row is 1⅞ inches. The refrigerant inlet and outlet risers are arranged as shown in FIGURE 5 and the feed tubes have an internal diameter of ⅛ inch. Condenser tube supports were spaced at intervals of 3½ feet and a baffle plate was inserted between the outer two rows of condenser tubes extending down from the wall of the chamber past half of the condenser tubes in the adjacent rows and extending longitudinally between two tube supports. A batch of particulate frozen coffee extract was placed in the drying chamber, the chamber door was closed, the chamber evacuated to a pressure of less than 1 millimeter of mercury, and heat applied to the frozen extract under controlled conditions in order to vacuum freeze-dry the coffee solids.

The condenser efficiently handled water vapor at condensation rates in excess of 700 pounds of water per hour. Ice build-up on the condenser tubes was uniform and the total ice load was in excess of 2000 pounds. The oil in the vacuum pumps showed no sign of water contamination.

Example 2

The condenser of Example 1 was used in successive runs as described in Example 1 for a period of one month. Between drying runs, the pressure in the chamber was increased to atmospheric pressure, the chamber door was opened, the freeze-dried product was removed from the chamber and the condenser was defrosted.

After one month, no plugged condenser tubes were encountered. Ice build-up on all condenser tubes was uniform from run to run. No water contamination of the vacuum pump oil was encountered and use of auxiliary equipment for stripping water out of the oil was discontinued.

The invention having thus been described, what is believed to be new and desired to be protected by Letters Patent is:

1. A vacuum freeze-dryer comprising a vacuum chamber with a horizontal axis; a set of spaced, longitudinally extending vapor condensing tubes mounted in said chamber at each side of the chamber, said mounting being tube supports uniformly spaced in a longitudinal direction and said tube supports being in intimate contact with the walls of the chamber, the tubes in said set arranged in laterally spaced vertical rows, the tubes in said rows being uniformly spaced in a vertical direction, the tubes in adjacent rows being staggered whereby a horizontal line through the center of a tube in one row passes through the vertical space between two tubes in an adjacent row, the sets being laterally spaced to receive a product loaded car; means for refrigerating said condensing tubes and means for removing non-condensable vapors from said vacuum chamber to a vacuum source.

2. The freeze-dryer of claim 1 wherein the vacuum chamber is cylindrical.

3. The freeze-dryer of claim 1 wherein a baffle plate is mounted vertically between two rows of tubes, said baffle plate extending vertically down from the top of the vacuum chamber past from one-third to two-thirds of the condensing tubes in adjacent rows, said baffle plate extending longitudinally parallel to the condensing tubes, the condensing tubes in a set between said baffle plate and the center of the chamber being a primary condensing zone, the condensing tubes between said baffle plate and the wall of the chamber being secondary condensing zone, and said means for removing non-condensable vapors being in the form of a pipe, said pipe having an opening situated at the top of the vacuum chamber above the tubes of said secondary condensing zone.

4. The freeze-dryer of claim 3 wherein said baffle plate is mounted vertically between the outer two rows of condensing tubes, and said baffle plate extending longitudinally the full distance between two adjacent tube supports.

5. The freeze-dryer of claim 1 wherein the refrigerating means for the condenser tubes comprise liquid risers, feed tubes connecting said risers, and inlets on said condensing tubes, the minimum internal diameter of said feed tubes being 1/8 of an inch, and outlet risers for conveying refrigerant to a vapor liquid separator.

6. The freeze-dryer of claim 4 wherein the vacuum chamber is cylindrical and wherein the refrigerating means for the condenser tubes comprise liquid risers, feed tubes connecting said risers, and inlets on said condensing tubes, the minimum internal diameter of said feed tubes being 1/8 of an inch, and outlet risers for conveying refrigerant to a vapor liquid separator.

References Cited

UNITED STATES PATENTS

| | | | |
|---|---|---|---|
| 3,132,930 | 5/1964 | Abbott | 34—92 |
| 3,299,525 | 1/1967 | Thuse | 34—5 |
| 3,365,806 | 1/1968 | Pfluger | 34—92 |

WILLIAM J. WYE, *Primary Examiner.*